United States Patent Office 3,214,409
Patented Oct. 26, 1965

3,214,409
EPOXIDIZED NOVOLAC-FATTY GUANAMINE COMPOSITION
Dwight E. Peerman, Minneapolis, Minn., assignor to General Mills, Inc., a corporation of Delaware
No Drawing. Filed Apr. 29, 1963, Ser. No. 276,159
10 Claims. (Cl. 260—59)

This application is a continuation-in-part of my application Serial No. 102,391, filed April 12, 1961, now abandoned.

This invention relates to compositions which are the reaction product of epoxidized novolac resins and fatty substituted guanamines. The invention further relates to the partially cured products or B-stage resins of the epoxide and guanamine, which are reactive at elevated temperatures to produce the final cured composition. Such partially cured resins are low molecular weight polymers which are thermoplastic but are capable of rapid reactions at an elevated temperature to an insoluble infusible polymer. This intermediate state of reaction can be changed at will by heating for a short time at an elevated temperature to effect completion of the reaction or conversion to the finally cured or "C stage" form.

The epoxidized novolac resins are highly functional, having on the average, more than three epoxide groups per molecule. In contrast to these novolac resins, the conventional epoxy resins prepared from epichlorohydrin and 2,2-bis(p-hydroxy phenyl) propane (bisphenol A) having an equivalent weight of about 190, contain about 2 epoxide groups per molecule. Having this very reactive configuration, it would thus be expected that difficulty would be encountered in preparing stable partially cured or B-stage intermediates from the epoxidized novolac resins. This is particularly true since relatively slow curing agents such as aromatic amines, i.e. metaphenylene diamine, methylenedianiline, and 4,4'-diaminodiphenyl sulfone, will gel at room temperature. Unexpectedly, however, despite this high degree of reactivity, it was discovered possible to form stable B-stage intermediate resins of long shelf life from the epoxidized novolac resins and fatty substituted guanamines. Molding compounds from this type of B-staged blends have been successfully molded after three months on the shelf at ambient room temperature. In addition, the epoxidized novolac, it was discovered, provides an increase in heat distortion value over the commercial epoxy resins when both are cured with the fatty guanamines. Molded specimens with the conventional epoxies and fatty guanamines were found to be "tender" and easily deformed at 300° F. molding temperature when removed from the mold, whereas molding compounds of the epoxidized novolac and fatty guanamine composition did not have this disadvantage when removed from compression molds even at 350° F.

It is therefore an object of this invention to provide epoxidized novolac-fatty guanamine compositions.

It is also an object of this invention to provide a partially cured epoxidized novolac-guanamine composition which is stable for extended periods of time but which is capable of rapid reaction at elevated temperatures.

It is also an object of this invention to provide such compositions which are suitable for use as molding compounds, and the like.

The epoxide materials which may be employed in this invention are the epoxidized novolac resins. Such resins are well known substances and are readily available commercially. The resins may be represented by the following theoretical idealized formula:

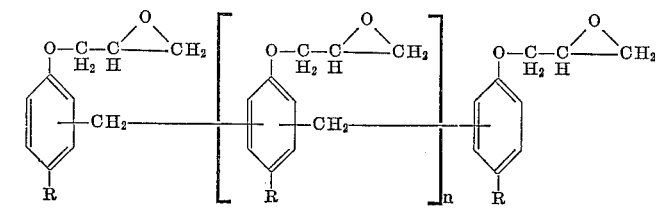

where R is selected from the group consisting of hydrogen and alkyl groups having up to 18 carbon atoms and $n$ is an integer from 1 to 5. In general, $n$ will be an integer in excess of 1 to about 3.

In general, these resins are obtained by epoxidation of the well-known novolac resins. The novolac resins, as is known in the art, are produced by condensing the phenol with an aldehyde in the presence of an acid catalyst. Although novolac resins from formaldehyde are generally employed, novolac resins from other aldehydes such as, for example, acetaldehyde, chloral, butyraldehyde, furfural, and the like, may also be used. The alkyl group if present may have a straight or a branched chain. Illustrative of the alkyl phenol from which the novolac resins may be derived are cresol, butylphenol, tertiary butylphenol, tertiary amylphenol, hexylphenol, 2-ethylhexyl phenol, nonylphenol, decylphenol, dodecylphenol, and the like. It is generally preferred, but not essential, that the alkyl substituent be linked to the peracarbon atom of the parent phenolic nucleus. However, novolac resins in which the alkyl group is in the ortho position have been prepared.

The epoxidized novolac resin is formed in the well-known manner by adding the novolac resin to the epichlorohydrin and then adding an alkali metal hydroxide to the mixture so as to effect the desired condensation reaction. The resins may be characterized in the usual manner by their epoxy equivalent weight. In general, the epoxidized novolac resins suitable for use in this invention will have an epoxy equivalent weight range of from 160 to 325 and preferably from 175 to 225. For the purposes of illustrating the present invention, an epoxidized novolac resin, commercially available, where R in the aforementioned formula is hydrogen, having an epoxy equivalent weight of from 175 to 182, a specific gravity of 1.22 and a viscosity at 125° F. of 30,000–90,000 cps. was used.

A wide variety of guanamines may be employed in the present invention. They may be represented by the following formulae:

(A)

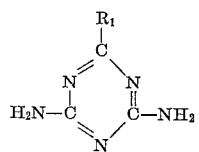

(B) 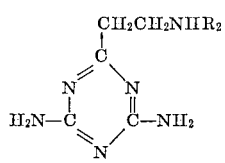

(C) 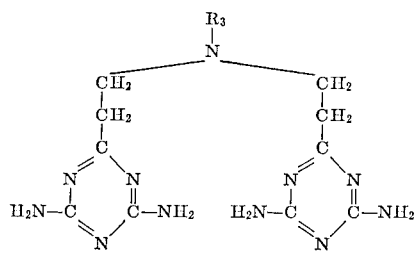

(D) 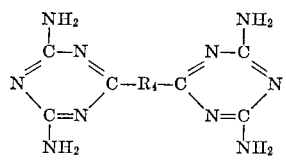

where $R_1$ is an aliphatic hydrocarbon group containing from 4 to about 21 carbon atoms, $R_2$ and $R_3$ are aliphatic hydrocarbon groups containing from 4 to about 21 carbon atoms and $R_4$ is the hydrocarbon group of dimerized unsaturated fatty acids. $R_1$, $R_2$ and $R_3$ preferably contain from 6 to 21 carbon atoms.

The foregoing guanamine compounds may be defined generally by the following formula:

$$(A)_xB$$

where A is the ring

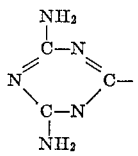

$x$ is an integer of 1 to 2 and B is selected from the group consisting of $R_1$, $R_2NHCH_2CH_2-$, $R_3N(CH_2CH_2-)_2$ and $R_4$ where $R_1$ is an aliphatic hydrocarbon group having from 4 to about 21 carbon atoms, $R_2$ and $R_3$ are aliphatic hydrocarbon groups containing from 4 to about 21 carbon atoms and $R_4$ is the hydrocarbon group of dimerized unsaturated fatty acids.

These guanamines are conveniently made from dicyandiamide and nitriles. Thus the aliphatic substituted guanamines of the Formula A may be made from aliphatic nitriles such as those derived from fatty acids. Compound B may be made from the nitrile

which is the acrylonitrile adduct with the fatty amine $R_2NH_2$. Compound C may be made from the acrylonitrile diadduct of the fatty amine $R_3NH_2$,

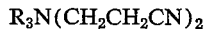

Compound D may be made from the dinitrile prepared from dimerized fatty acids such as linoleic acid. Thus, the fatty guanamines may be prepared from higher fatty acids containing from 5 to 22 carbon atoms by converting the fatty acids to the nitriles and then reacting the nitriles with dicyandiamide. The fatty acid employed may be a single isolated fatty acid or may be the mixed fatty acids from a fat or oil or any selected fraction of such fatty acids. Moreover, the fatty acids may be either saturated or unsaturated. In addition, it is understood that the term "fatty" as used herein is not intended to exclude the branch chain products having the same number of carbon atoms. In the examples to follow, the fatty guanamines derived from the $C_8$ to $C_{18}$ acids of coconut oil are referred to as cocoguanamines.

By "B-stage" resins is meant a partially cured product which will undergo little or no physical change during extended storage and in which the two reactants are homogenously compatible in a stable compound, ready for final curing at elevated temperatures. A B-stage resin can generally be described as a partially cured composition which is stable for extended periods of time but is capable of being quickly cured at elevated temperatures. The epoxide-guanamine composition may be described as proceeding through three stages, A, B, and C.

The "A-stage" would be a simple blend or mixture of the epoxy resin and guanamine in which essentially no reaction has taken place. Such a simple blend or mixture will be stable for great lengths of time, but may or may not be a homogenous, one-phase material.

The "B-stage" is the same resin composition which has been partially reacted or cured and is quite stable for extended periods of time. The "B-stage" resin can be cured at elevated temperature to yield the finally cured stage, the "C-stage," which is an infusible and insoluble polymer. It is normally a homogenous, one-phase substance, unless compounded with fillers, pigments, or reinforcements.

The "A-stage" mixture may, of course, be cured at elevated temperature to provide an insoluble, infusible polymer. However, longer times for curing are required. The use of a "B-stage" resin allows for more rapid curing when required and still provides a stable starting material. It also frequently provides the material in a form convenient for handling as a homogenous solid, liquid, or solution of desirable viscosity characteristics.

"B-stage" resins are prepared by heating a mixture of the two constituents to effect partial curing and stopping such curing before the "C-stage" is reached. This partial curing can be effected at various temperatures. At higher temperatures, the time of heating becomes short for producing the "B-stage" resin and care must be taken that the time is not sufficiently extended so as to result in the "C-stage." At lower temperatures, the heating period is slightly longer and more control can be exercised. As a practical matter, the epoxide-guanamines employed in this invention will generally be "B-staged" at temperatures in the range of 120 to 170° C. Temperatures outside this range may be used, however, although such may present some problems. For example, at temperatures above 180° C., the time of heating is so short that it is difficult to prevent advancement of the cure to the "C-stage" or finally cured product. At temperatures below 100° C., the time of heating is so prolonged as to be impractical or uneconomical. A common temperature used in practice is about 150° C. at which temperature the heating period is sufficiently long to allow for control over the reaction and yet is not an impractical or uneconomical length of time.

Since the temperature and period of heating will vary somewhat, dependent on the particular epoxy resin, particular guanamine and the proportions thereof, some means of indicating when the "B-stage" resin is reached had to be devised. It is, of course, most important that the reaction not be carried out to the point where gelation occurs. One means of avoiding this point of gelation, which can be used during the heating period, is the observance of the viscosity of the product. Another means is to determine the oxirane oxygen content periodically and observe the rate of change thereof. It is also important to observe at what stage the blend becomes homogeneous.

In observing the viscosity during heating, it will be noted that very little change occurs during the initial heating period. As heating is continued, the rate of change in viscosity begins to increase somewhat, and just prior to gelation, the rate increases very rapidly. When this rate increases greatly, the heating must be stopped quickly and the product cooled or gelation would occur in a few minutes. This viscosity may be measured during the course of a reaction so that the "breaks" in rate of viscosity rise may be observed to indicate the correct time to discontinue heating.

In the oxirane-oxygen test, samples are withdrawn periodically and the oxirane-oxygen content determined by titration with HBr in acetic acid. Since HBr titrates both oxirane-oxygen and the amino groups in the guanamine, a value is obtained which is the sum of both. The amine contribution to the titration is small and should theoretically remain constant, so that any decrease in titration should be attributable to the disappearance of oxirane-oxygen. With some of the compositions, it may be difficult to follow the decrease in oxirane-oxygen content in that as the reaction becomes more and more complete, the product becomes more and more insoluble and no suitable solvent may be found for dissolving the product in order to titrate the samples. In such event, reliance must be placed upon the rate of change of viscosity.

Thus, "B-stage" resins may be prepared by heating the mixture of components at temperatures of from 100 to 210° C., preferably 120 to 170° C., so as to advance the cure. Heating is terminated and cooling begun before final curing occurs so that a partially cured resin results. The termination point may be determined by observation of the viscosity and, where practicable, the oxirane-oxygen content. In general, a "B-stage" resin will exist when the reaction is from about 5 to 90% complete, based on the disappearance of oxirane-oxygen. The reaction, of course, must be stopped prior to complete curing. As a practical matter the preferred "B-stage" resins are those in which the reaction is from about 15 to 50% complete, the most desirable being about 20 to 40% complete. For purposes of illustration, a mixture of 247.5 grams of an epoxidized novolac resin, having an epoxy equivalent weight of about 180 and 52.5 grams of cocoguanamine were heated for 86 minutes at 150° C. in a reaction vessel equipped with a thermometer, stirrer, viscometer spindle and heater. Viscosity was measured periodically to gauge the degree of reaction. The viscosity measurements may be seen in the following Table I.

TABLE I

| Time (min.): | Viscosity (cps.) |
|---|---|
| 0 | 40 |
| 18 | 60 |
| 31 | 80 |
| 45 | 100 |
| 61 | 140 |
| 70 | 240 |
| 81 | 700 |
| 84 | 1400 |
| 85.5 | 2600 |
| 86 | Solidified |

In the foregoing table, 0 time is that time in which the reaction temperature of 150° C. was initially reached. As is apparent from the table, the increase in viscosity occurs slowly initially and then at a quickening rate until gelation occurs. The heating must be terminated prior to gelation to provide a "B-stage" resin. At 150° C., the practical "B-stage" area for the particular mixture is achieved after heating in excess of 45 minutes. The reaction must be terminated prior to solidification which results at about 85 to 86 minutes.

It is understood that the foregoing discussion herein represents one specific epoxy novolac resin and guanamine composition. The "B-staging" point will vary, dependent upon the materials, proportions thereof, temperature, time and addition of fillers. However, it is a simple matter to prepare such a representation for any other specific composition, which will thereby take into account any of the variables, by means of the methods described. The invention is not limited to "B-stage" resins produced at any particular temperature for any particular time period, but encompasses any partially cured composition of the two constituents which are stable for extended periods of time and are capable of being cured to a final and infusible insoluble polymer.

The epoxy novolac-guanamine composition reacts or cures very slowly below 120° C. At temperatures below this, the compositions are quite stable for extended periods of time. In order to illustrate the stability of the "B-stage" product, a blend of 990 parts by weight of an epoxy-novolac resin having an epoxy equivalent weight of about 180 and 210 parts by weight of cocoguanamine were partially cured at 150° C. for a period of 20 minutes. After cooling, the partially cured resin was subjected to heating at 160° F. to illustrate the stability thereof. Initially the partially cured blend had an oxirane-oxygen content of 8.14%. After 52 hours at 160° F. the blend had an oxirane-oxygen content of 6.40%. At 94 hours at 160° F., the blend became hard and insoluble having a Barcol hardness of 44. It is apparent that the composition is very stable at ordinary temperatures in view of the foregoing data on an accelerated aging test run at 160° F.

The guanamine is used in an amount sufficient to cure the epoxy resins to infusible and insoluble polymers. Particularly suitable products are those in which the guanamine is used in the range of from 5 to 30% by weight based on the combined weight of the guanamines and epoxy novolac material, and preferably, from 10 to 20%.

The following examples will serve to further illustrate the invention.

*Example I*

Five ratios of fatty guanamine to an epoxy novolac resin were blended and reacted to determine the ratio giving the highest heat distortion temperature. Blends containing 15, 17½, 20, 22½, and 25 percent by weight of a guanamine corresponding to Formula A, in which $R_1$ has 11 carbon atoms, were blended with an epoxy novolac having an equivalent weight of 180 and cured for four hours at 150° C. The resulting hard thermosetting resins had the following heat distortion temperatures (HDT):

| Percent guanamine: | HDT, ° C. |
|---|---|
| 15 | 115 |
| 17½ | 130 |
| 20 | 130 |
| 22½ | 122 |
| 25 | 110 |

The optimum heat distortion temperature is obtained at a ratio of between 17½ and 20 parts of the fatty guanamine which provides for maximum resistance to flexural bending under heat. In contrast, the Bisphenol A epichlorohydrin epoxy resins of an equivalent weight of about 190 have an optimum heat distortion temperature of 105° C. with this guanamine.

*Example II*

Four samples of an epoxidized novolac resin having an equivalent weight of 175 were made with cocoguanamine. The percentages by weight of guanamine in the four compositions were as follows: 20, 17½, 15, and 12½. They had respectively the following heat distortion temperatures: 144° C., 144, 142, 99. For optimum HDT, therefore, the best ratio of guanamine to epoxy resin lies between 17.5 and 20% by weight of this material. This blend enjoys an advantage of 35° C. in flexural deformation temperature over the corresponding blend of Bisphenol A epichlorohydrin epoxy resin and guanamine of similar chain length.

*Example III*

Eighty parts by weight of an epoxy novolac of equivalent weight 180 were blended with 20 parts by weight of the guanamine of Example I and 50 parts by weight of aluminum oxide in tabular shape in 325 mesh size was added. The filled resins were applied to sheets of 24ST aluminum, 0.064" thick. The sheets were overlapped ½ inch and were cut into strips 1 inch wide so that the area of overlap was a nominal ½" x 1" or ½ square inch. These were tested for tensile shear strength according to military specification Mil A 5090B. At room temperature this adhesive had a tensile shear strength of 1228 pounds per square inch (average of six specimens).

*Example IV*

Forty parts by weight of an epoxy novolac were blended with 40 parts by weight of an epoxy resin which is the glycidyl ether of tetraphenol ethane having a functionality of oxirane oxygen of between three and four. After heating the resins in the molten state to effect a homogeneous blend, 25 parts by weight of a guanamine corresponding to Formula A in which $R_1$ is the aliphatic group from hydrogenated tallow oil acids were added. When thoroughly homogeneous, a filler comprising anhydrous kaolin clay was added to the extent of 25 parts by weight. This adhesive was applied to strips of aluminum as in the previous example and tested for tensile shear at 75° F. and at 250° F. At 75° F. it had a tensile shear strength of 1903 pounds per square inch. At 250° F. the tensile shear strength was 983 p.s.i. These tensile shear strength values represent the average of five individual specimens.

*Example V*

A compression molding compound was prepared by blending 80 parts by weight of an epoxy novolac resin with 20 parts by weight of the guanamine of Example I. To this was added, with high shear at 140° C., 20 parts by weight of flake glass and 13½ parts by weight of finely divided mica. This compound was "B" staged in an oven at 320° F. for 30 minutes. It was then cured in compression molding dies at 800 p.s.i. using a mold temperature of 350° F. for five minutes. The molded specimens had the following characteristics:

| | |
|---|---|
| Barcol hardness | 80 |
| Falling ball impact resistance, lbs. | 0.50 |
| 24 hr. water absorption, percent increase in weight | 0.04 |
| Tensile strength, pounds per square inch | 4040 |
| Shrinkage from mold dimension, percent | 0.5 |
| Heat distortion temperature, ° C. | 129 |
| Flexural modulus, pounds per square inch | 2.22 x 10⁵ |
| Flexural ultimate strength, p.s.i. | 8300 |

*Example VI*

A compression molding compound was prepared using the following materials:

| | Parts by weight |
|---|---|
| Epoxidized novolac resin of equivalent weight 180 | 80 |
| Guanamine of Example I | 20 |
| Flake Glass | 20 |
| Finely divided walnut shell flour | 20 |
| Nylon floc | 5 |

These materials were blended at 140° C. in a Baker-Perkins blender with dispersion blades. It was "B" staged one hour at 150° C. and the specimens after formation at 375° F. and 1000 p.s.i. were postcured two hours 300° F. They had the following characteristics:

| | |
|---|---|
| Flexural deformation temperature ° C. | 190 |
| Percent shrinkage from mold | 0.4 |
| 24 hr. water absorption, percent | 0.09 |
| Falling ball impact resistance, lbs. | 1.54 |
| Barcol hardness | 80–82 |
| Tensile strength p.s.i. | 6330 |
| Flexural modulus p.s.i. | 2.6 x 10⁵ |
| Flexural ultimate strength p.s.i. | 10,800 |

*Example VII*

A compression molding compound was fabricated using 80 parts by weight of epoxidized novolac resin having equivalent weight 179, 20 parts by weight of guanamine of Example I and 72 parts by weight of short fibered asbestos. These were blended hot as described previously and "B" staged in a similar manner. They had, after molding, the following physical characteristics:

| | |
|---|---|
| Heat distortion temperature ° C. | 150 |
| Falling ball impact pounds | 0.38 |
| Shrinkage percent | 0.8 |
| Water absorption 24 hrs. do | 0.6 |
| Flexural ultimate strength p.s.i. | 10,600 |
| Barcol hardness | 98–100 |

*Example VIII*

A compression molding compound was formulated using 80 parts by weight of epoxy novolac having equivalent weight of 179, 20 parts by weight of guanamine of Example I and 167 parts of surface activated kaolin clay, the materials being blended and "B" staged as described previously. The properties of this material, after molding, were as follows:

| | |
|---|---|
| Heat distortion temperature ° C. | 156 |
| Falling ball impact lbs. | 0.18 |
| Shrinkage percent | 0.94 |
| 24 hr. water absorption do | 0.08 |
| Flexural ultimate p.s.i. | 11,750 |
| Barcol hardness | 96–98 |

*Example IX*

A compression molding composition was formulated using 80 parts by weight of epoxidized novolac of equivalent weight 179, 20 parts by weight of the guanamine of Example I, 180 parts by weight of finely divided mica. This compound was produced and "B" staged as described previously. It had, after molding, the following physical characteristics:

| | |
|---|---|
| Heat distortion temperature ° C. | 169 |
| Falling ball impact lbs. | 0.38 |
| Shrinkage percent | 0.72 |
| 24 hr. water absorption do | 0.8 |
| Flexural ultimate p.s.i. | 7,900 |
| Barcol hardness | 96–98 |

*Example X*

Eighty parts by weight of an epoxy novolac were blended with twenty parts by weight of the guanamine of Example I and thirty-five parts by weight of finely divided mica. The blend was blended thoroughly and "B" staged for 50 minutes at 300° F. It was compression molded at 10,000 p.s.i., 10 minutes at 300° F. after which it had the following properties:

| | |
|---|---|
| Heat distortion temperature ° C. | 133 |
| Barcol hardness | 86–88 |
| $H_2O$ absorption, 24 hrs. percent | 0.2 |
| Flexural strength p.s.i. | 6,500 |
| Flexural modulus p.s.i. | 8.7 x 10⁵ |
| Tensile strength p.s.i. | 3,900 |

While various modifications of the invention have been described, it is to be understood that the same is not limited thereto but may be varied within the scope of the following claims.

I claim:

1. A curable composition stable for extended periods of time at ambient room temperature comprising an epoxidized novolac resin partially cured to from 5 to 90% with a guanamine selected from the group consisting of (A) 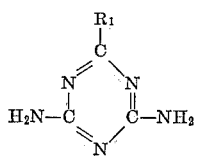

(B) 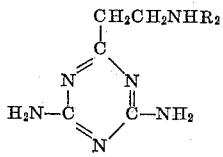

(C) 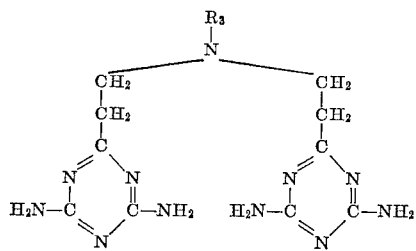

(D) 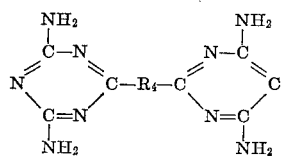

where $R_1$, $R_2$ and $R_3$ are aliphatic hydrocarbon groups having from 4 to about 21 carbon atoms and $R_4$ is the divalent hydrocarbon group of dimerized unsaturated fatty acids of 5 to 22 carbon atoms, said guanamine being present in said composition in an amount sufficient to cure said epoxidized novolac resin to an infusible, insoluble polymer.

2. A curable composition as defined in claim 1 in which said guanamine is present in an amount of 5 to 30% by weight based on the total amount of guanamine and epoxidized novolac resin.

3. A curable composition stable for extended periods of time at ambient room temperature comprising an epoxidized novolac resin partially cured to from 5 to 90% with a guanamine having the formula:

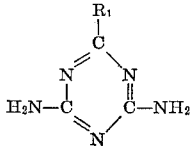

where $R_1$ is an aliphatic hydrocarbon group having from 4 to about 21 carbon atoms, said guanamine being present in said composition in an amount sufficient to cure said epoxidized novolac resin to an infusible, insoluble polymer.

4. A curable composition stable for extended periods of time at ambient room temperature comprising an epoxidized novolac resin partially cured to from 5 to 90% with a guanamine having the formula:

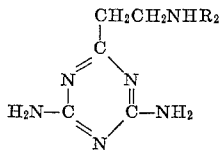

where $R_2$ is an aliphatic hydrocarbon group having from 4 to about 21 carbon atoms, said guanamine being present in said composition in an amount sufficient to cure said epoxidized novolac resin to an infusible, insoluble polymer.

5. A curable composition stable for extended periods of time at ambient room temperature comprising an epoxidized novolac resin partially cured to from 5 to 90% with a guanamine having the formula:

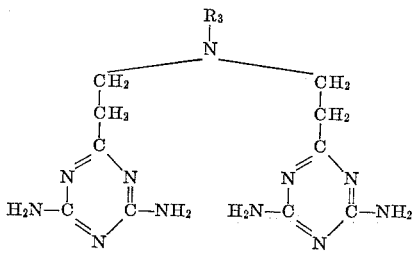

where $R_3$ is an aliphatic hydrocarbon group having from 4 to about 21 carbon atoms, said guanamine being present in an amount sufficient to cure said epoxidized novolac resin to an infusible, insoluble polymer.

6. A curable composition stable for extended periods of time at ambient room temperature comprising an epoxidized novolac resin partially cured to from 5 to 90% with a guanamine having the formula:

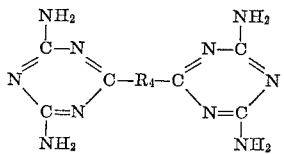

where $R_4$ is the divalent hydrocarbon group of dimerized unsaturated fatty acids of 5 to 22 carbon atoms, said guanamine being used in an amount sufficient to cure said epoxidized novolac resins to an infusible, insoluble polymer.

7. A process of producing a heat curable composition stable for extended periods of time at ambient room temperature comprising reacting at a temperature of from 100 to 210° C. an epoxidized novolac resin with an amount sufficient to cure said resin to an infusible, insoluble polymer of a guanamine selected from the group consisting of:

(A) 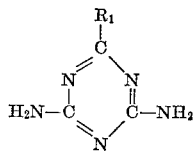

(B) 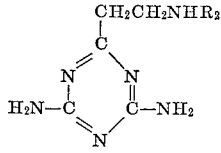

(C) 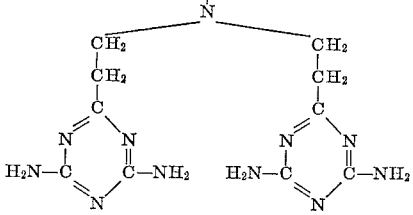

(D) 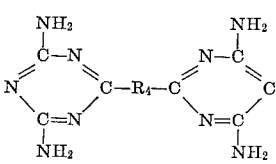

where $R_1$, $R_2$ and $R_3$ are aliphatic hydrocarbon groups having from 4 to about 21 carbon atoms and $R_4$ is the divalent hydrocarbon group of dimerized unsaturated fatty acids of 5 to 22 carbon atoms and terminating said reaction by cooling when 5 to 90% complete.

8. A process as defined in claim 7 in which said reaction is terminated when 10 to 50% complete.

9. A process as defined in claim 7 in which said guanamine is employed in an amount of 5 to 30% by weight based on the total amount of guanamine and epoxidized novolac resin.

10. A process as defined in claim 7 in which said guanamine has the Formula A.

References Cited by the Examiner

UNITED STATES PATENTS

| | | | |
|---|---|---|---|
| 2,801,229 | 7/57 | De Hoff | 260—47 |
| 2,928,811 | 3/60 | Belanger | 260—47 |
| 3,014,893 | 12/61 | Susman et al. | 260—58 |

FOREIGN PATENTS 629,111   9/49   Great Britain.

OTHER REFERENCES

Lee et al.: Epoxy Resins, pp. 17–18 and 51–52, McGraw-Hill Book Co. (1957).

WILLIAM H. SHORT, *Primary Examiner.*